(12) United States Patent
Hartmann et al.

(10) Patent No.: US 11,155,421 B2
(45) Date of Patent: Oct. 26, 2021

(54) CONVEYING DEVICE AND METHOD FOR CONVERTING A SERIALLY TRANSPORTED PIECE GOODS STREAM INTO A PARALLELLY TRANSPORTED PIECE GOODS STREAM

(71) Applicants: Bernd Hartmann, Grafschaft-Leimersdorf (DE); Alexander Winnebeck, Bonn (DE)

(72) Inventors: Bernd Hartmann, Grafschaft-Leimersdorf (DE); Alexander Winnebeck, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/932,279

(22) Filed: Jul. 17, 2020

(65) Prior Publication Data
US 2021/0016979 A1 Jan. 21, 2021

(30) Foreign Application Priority Data
Jul. 19, 2019 (DE) ...................... 10 2019 119 595.0

(51) Int. Cl.
*B65G 47/71* (2006.01)
*B65G 41/00* (2006.01)
(Continued)

(52) U.S. Cl.
CPC .......... *B65G 47/71* (2013.01); *B65G 41/005* (2013.01); *B65G 47/57* (2013.01); *B65G 47/945* (2013.01);
(Continued)

(58) Field of Classification Search
CPC .... B65G 47/082; B65G 47/086; B65G 47/68; B65G 47/683; B65G 47/71; B65G 41/005;
(Continued)

(56) References Cited

U.S. PATENT DOCUMENTS 2,949,999 A 8/1960 Sundin
3,160,259 A 12/1964 Dalton
(Continued)

FOREIGN PATENT DOCUMENTS

CN 109 178 898 A 1/2019
DE 92 02 676 U1 5/1992
(Continued)

*Primary Examiner* — James R Bidwell
(74) *Attorney, Agent, or Firm* — Reinhart Boerner Van Deuren P.C.

(57) ABSTRACT

A conveying device for converting a serially transported piece goods stream into a parallelly transported piece goods stream. A feed belt conveyor serially feeds the piece goods stream, and a plurality of discharge belt conveyors parallelly discharge the fed piece goods stream. The discharge belt conveyors are assigned to a longitudinal side of the feed belt conveyor. The directions of transport of the discharge belt conveyors are oriented parallel to one another and transversely to the direction of transport of the feed belt conveyor. The discharge belt conveyors are configured as telescopic belt conveyors. The longitudinal side of the upper strand of the feed belt conveyor that is assigned to the discharge belt conveyors is arranged lower than the opposite longitudinal side of the upper strand of the feed belt conveyor.

14 Claims, 4 Drawing Sheets

(51) Int. Cl.
*B65G 47/57* (2006.01)
*B65G 47/94* (2006.01)
*B65G 67/08* (2006.01)
*B65G 67/20* (2006.01)

(52) U.S. Cl.
CPC ............. *B65G 67/08* (2013.01); *B65G 67/20* (2013.01); *B65G 2814/0311* (2013.01)

(58) Field of Classification Search
CPC ...... B65G 47/57; B65G 47/945; B65G 67/08; B65G 67/20
USPC .................................................. 198/426, 436
See application file for complete search history.

(56) References Cited

U.S. PATENT DOCUMENTS

| | | | |
|---|---|---|---|
| 3,193,079 A * | 7/1965 | Winter, IV | B65G 47/086 198/426 |
| 4,461,378 A | 7/1984 | Roth | |
| 5,009,560 A | 4/1991 | Ruder et al. | |
| 5,392,927 A * | 2/1995 | Haverkamp Begemann | B07C 1/04 198/370.08 |
| 5,645,390 A * | 7/1997 | Filiberti | B60P 1/38 15/3 |
| 6,015,039 A | 1/2000 | Bonnet | |
| 6,016,963 A | 1/2000 | Ezawa et al. | |
| 8,622,199 B2 | 1/2014 | Windfeld et al. | |
| 2009/0110522 A1* | 4/2009 | Criswell | B65G 67/08 414/398 |
| 2012/0160636 A1* | 6/2012 | Windfeld | B65G 41/005 198/592 |

FOREIGN PATENT DOCUMENTS

| | | |
|---|---|---|
| DE | 102 55 843 A1 | 6/2004 |
| GB | 2 240 530 A | 8/1991 |
| JP | S59 207316 A | 11/1984 |
| WO | WO 94/08878 A1 | 4/1994 |
| WO | WO 2018/065600 A1 | 4/2018 |

* cited by examiner

CONVEYING DEVICE AND METHOD FOR CONVERTING A SERIALLY TRANSPORTED PIECE GOODS STREAM INTO A PARALLELLY TRANSPORTED PIECE GOODS STREAM

CROSS-REFERENCE TO RELATED PATENT APPLICATIONS

This patent application claims the benefit of German Patent Application No. 10 2019 119 595.0, filed Jul. 19, 2019, the entire teachings and disclosure of which are incorporated herein by reference thereto.

FIELD

The invention relates to a conveying device for converting a serially transported piece goods stream into a parallelly transported piece goods stream, comprising a feed belt conveyor for the serial feeding of the piece goods stream and comprising a plurality of discharge belt conveyors for the parallel discharging of the fed piece goods stream, wherein the discharge belt conveyors are assigned directly or indirectly to a longitudinal side of the feed belt conveyor, wherein the directions of transport of the discharge belt conveyors are oriented at least substantially parallel to one another and transversely to the direction of transport of the feed belt conveyor, and wherein the discharge belt conveyors are configured as telescopic belt conveyors. The invention further relates to a method for converting a serially transported piece goods stream into a parallelly transported piece goods stream, using a feed belt conveyor for the serial feeding of the piece goods stream and using a plurality of discharge belt conveyors, configured as telescopic belt conveyors, for the parallel discharging of the fed piece goods stream, wherein the discharge belt conveyors are assigned directly or indirectly to a longitudinal side of the feed belt conveyor, wherein the directions of transport of the discharge belt conveyors are oriented at least substantially parallel to one another and transversely to the direction of transport of the feed belt conveyor.

BACKGROUND

Conveying devices and methods for converting a serially transported piece goods stream into a parallelly transported piece goods stream are already known in different configurations. It is here a matter of diverting piece goods, which are fed at least substantially in a row one behind another, via a feed belt conveyor, onto discharge belt conveyors in such a way that the piece goods are distributed among the discharge belt conveyors and are then transported onward at least substantially parallel to one another. In other words, from a row of piece goods on the feed belt conveyor, a plurality of roughly parallel rows of piece goods are made on the discharge belt conveyors.

For this purpose, the discharge belt conveyors are mostly provided directly on a transfer portion of a longitudinal side of the feed belt conveyor, so that the piece goods can make their way directly laterally from the feed belt conveyor onto the various discharge belt conveyors. However, it would also be conceivable for there to be provided between the feed belt conveyor and the discharge belt conveyors also at least one short intermediate conveyor, which can be configured, for instance, as a chute or inclined roller conveyor. In order to conduct the piece goods laterally downward from the feed belt conveyor and distribute them among the plurality of discharge belt conveyors, appropriate guide devices, for example in the form of rollers, baffle plates or cams. If the transport path of the piece goods in the direction of the direction of transport on the discharge belt conveyors is intended to be varied, discharge belt conveyors in the form of telescopic belt conveyors can be considered. The length of the telescopic belt conveyors can be lengthened and shortened again by mutual extension and retraction of individual portions.

Appropriate conveying devices can be used, for instance, for the loading of load compartments. The piece goods can in this way be delivered via the discharge belt conveyors such that they are distributed over the width of the load compartment, where they are then are either grabbed by an employee and deposited or stacked in the load compartment, or automatically unloaded. The employee must hence not, or only to a very limited extent, move the individual piece goods in the transverse direction of the load compartment, thus, in particular, must not carry them back and forth over the width of the load compartment. Alternatively, a loading can be achieved automatically over the entire width of the load compartment.

Existing conveying devices and methods of said type are relatively complex, however, and thus prone to faults, which leads to an impaired efficiency of such systems. In this respect, there is therefore still need for improvement.

BRIEF SUMMARY

The object of the present invention is therefore to design and refine the conveying device and method respectively of the type stated in the introduction and previously described in greater detail, such that the conversion of a serially transported piece goods stream into a parallelly transported piece goods stream can be realized in a simpler and more reliable manner.

This object is achieved in a conveying device by virtue of the fact that that longitudinal side of the upper strand of the feed belt conveyor that is assigned to the discharge belt conveyors, in particular in a transfer setting, and at least in a transfer portion of the upper strand for relaying the piece goods to the discharge belt conveyors, is arranged lower than the opposite longitudinal side of the upper strand of the feed belt conveyor.

Said object is further achieved by a method for converting a serially transported piece goods stream into a parallelly transported piece goods stream, using a feed belt conveyor for the serial feeding of the piece goods stream and using a plurality of discharge belt conveyors, configured as telescopic belt conveyors, for the parallel discharging of the fed piece goods stream, wherein the discharge belt conveyors are assigned directly or indirectly to a longitudinal side of the feed belt conveyor, wherein the directions of transport of the discharge belt conveyors are oriented at least substantially parallel to one another and transversely to the direction of transport of the feed belt conveyor, in which, by means of the feed belt conveyor, a piece goods stream is fed in series,
  in which the feed belt conveyor is stopped when or before the, in the direction of transport of the feed belt conveyor, front piece goods reach the, in the direction of transport of the feed belt conveyor, front end of the feed belt conveyor,
  in which the piece goods are transferred from the feed belt conveyor to the discharge belt conveyors or are taken up from the feed belt conveyor by the discharge belt conveyors, in which the piece goods, in particular at least substantially simultaneously, are transported by the discharge belt conveyors, transversely to the direction of transport of the feed belt conveyor, away from the feed belt conveyor, in which the feed belt conveyor feeds further piece goods to the discharge belt conveyors.

Through the use of a longitudinal side of the upper strand of the feed belt conveyor, which longitudinal side is assigned to the discharge belt conveyors and, at least in a transfer portion of the upper strand, for the relaying of the piece goods to the discharge belt conveyors, is arranged lower than the opposite longitudinal side of the upper strand of the feed belt conveyor, the piece goods, where necessary, can slide solely by gravity from the feed belt conveyor in the direction of the discharge belt conveyors. Additional guide devices can therefore, where necessary, be completely dispensed with, or the guide devices can be configured in a particularly simple and reliable design.

According to the method, this can be exploited by, with the feed belt conveyor, feeding a piece goods stream in series until the, in the direction of transport, front piece goods have reached a specific portion of the feed belt conveyor. It is here particularly expedient if the feed belt conveyor is stopped as soon as the, in the direction of transport of the feed belt conveyor, front piece goods item reaches the region of the front end of the transfer portion. The piece goods arranged one behind another in the transfer portion of the feed belt conveyor are diverted onto the laterally assigned discharge belt conveyors. It can here be particularly beneficial if the piece goods are arranged in the transfer portion one behind another at a distance apart which at least substantially corresponds to the spacing of the discharge belt conveyors, to be precise preferably to the spacing of the center lines of the respectively adjacent discharge belt conveyors. In the manner described, each piece goods item can then be transferred to another discharge belt conveyor, so that the throughput, in total, is able to be raised.

The piece goods diverted onto the discharge belt conveyors can now be transported onward at least substantially parallel to one another. For the sake of simplicity, this is preferredly realized simultaneously. In other words, the transport of the piece goods on the discharge belt conveyors is preferredly realized at least substantially in parallel, not just spatially, but also chronologically. Meanwhile, via the feed belt conveyor, further piece goods can be fed so as to divert these, in a next step, onto the discharge belt conveyors. However, it will be particularly preferred if the feed belt conveyor is started up again only once the discharge belt conveyors have been halted, so that no unnecessary friction of the piece goods on the discharge belt conveyors takes place, so as to protect the piece goods from corresponding damage. Since the serially fed piece goods are converted into a parallel piece goods stream, a step-by-step transportation of the piece goods on the discharge belt conveyors does not lead to a pile-up of the piece goods and gives the employees, where necessary, sufficient time to take the piece goods one after another off the discharge belt conveyors and to deposit or stack them in the load compartment. The discharge belt conveyors should here be moved onward in steps to the point where, at their rear end, there is again sufficient space to respectively receive a further piece goods item.

For the sake of better comprehensibility and in order to avoid unnecessary repetitions, the conveying device and the method are described jointly below, without a specific distinction respectively being made between the conveying device and the method. For the person skilled in the art, it will be evident from the context, however, which features are respectively particularly preferred with regard to the conveying device and with regard to the method.

In a first, particularly preferred embodiment of the conveying device, the feed belt conveyor is configured such that it is adjustable from a transport setting into the transfer setting and back again. In the transport setting, the piece goods can hence be securely and reliably transported, while the piece goods can then, in the transfer setting, be securely and reliably passed on to the discharge belt conveyors. It can here be beneficial if the upper strand, in the transport setting, at least in the region of the transfer portion, is of at least substantially planar configuration. The planar orientation can here relate in particular to the cross sections of the upper strand at least in the transfer portion, which can then be of planar and/or of at least substantially horizontal orientation. Where necessary, it is here then possible for the upper strand, in the transfer portion, to run upward or downward, so that, in the transport of the piece goods, a height difference, can be overcome. In the transfer setting, the upper strand, however, at least in the transfer portion, is inclined to the side, to be precise such that that longitudinal side of the upper strand that is assigned to the discharge belt conveyors is arranged lower than the opposite longitudinal side of the upper strand, at least in the transfer portion. The piece goods then slide preferably without further assistance, and under their own volition, from the feed belt conveyor down in the direction of the discharge belt conveyors.

Alternatively or additionally, the discharge belt conveyors can have belts which have regions of different static friction. These regions are preferably provided alternatingly or alternately in the direction of transport of the belt. The regions of low static friction and/the regions of high static friction can here respectively have the same longitudinal extent. Moreover, all regions can have the same longitudinal extent. However, this is not necessary. It can be beneficial if the length of the regions of high static friction and/or low static friction are somewhat greater than the length, height and/or width of the piece goods. The regions of different static friction are in particular expedient if the feed belt conveyor, in the transfer portion, and the adjoining regions of the discharge belt conveyor are inclined to one another roughly in a V-shape. An adjustment of the transfer region of the feed belt conveyor is then not absolutely necessarily. The regions of low static friction can be positioned contiguous to the feed belt conveyor, while piece goods are fed via the feed belt conveyor, so that they can slide off without great friction on the belts of the discharge belt conveyors. Once the piece goods are supplied, the discharge belt conveyors can be started, while the feed belt conveyor can be halted. Via the regions of high static friction, the piece goods are then transported off from that roughly V-shaped region of the conveying device that is formed by the transfer portion and the adjoining portions of the discharge belt conveyors. The static friction is then large enough to cause a transport of the piece goods. It can also be provided that the discharge belt conveyors are driven continuously. Where necessary, the feeding of respectively further piece goods can then be realized such that it is tailored to the synchronization of the discharge belt conveyors in terms of the change of regions of different static friction contiguous to the transfer portion of the feed belt conveyor.

The static friction coefficient of the region of high static friction has together with a specific piece goods item, in particular having a cardboard contact surface, preferably a value which is at least twice, in particular at least three times, as high as the static friction coefficient of the region of low static friction together with the specific piece goods item, in particular having a cardboard contact surface. Alternatively or additionally, the static friction coefficient for the region of low static friction and the specific piece goods item, in particular having a cardboard contact surface, is less than 0.5, preferably less than 0.4, in particular less than 0.3. Alternatively or additionally, the static friction coefficient for the region of high static friction and the specific piece goods item, in particular having a cardboard contact surface, is greater than 0.5, preferably greater than 0.6, in particular greater than 0.7. The static friction coefficient is often also referred to as the friction factor and is regularly denoted as $\mu_H$ or $\mu_G$.

In order that the piece goods in the transfer portion of the feed belt conveyor slide down from the feed belt conveyor in a reliable manner, and further preferredly without further assistance, it can be beneficial if, at least in the transfer setting, at least the transfer portion of the upper strand of the feed belt conveyor, the upper strand, is inclined at an angle of at least 25°, preferably of at least 35°, in particular of at least 45°, to the side. Since the upper strand must have no completely straight cross section in the transfer portion, the previously stated inclination can here be constituted by a medium inclination. The inclination or the corresponding angle can here be averaged over at least substantially the total width of the upper strand in the transfer portion. It will nevertheless be particularly preferred, however, if the angle of inclination of the upper strand, viewed over the width of the upper strand, is at least substantially constant. Then the piece goods can be passed on in a particularly reliable manner, and without further assistance, from the feed belt conveyor to the discharge belt conveyors. Regardless thereof, the inclination is preferably provided such that that longitudinal side of the feed belt conveyor that is assigned to the discharge belt conveyors hangs downward.

The conversion of the serially transported piece goods stream into a parallelly transported piece goods stream is preferredly also accompanied by a change of direction of transport of the piece goods stream. This can preferably be realized such that the directions of transport of the discharge belt conveyors form with the direction of transport of the feed belt conveyor angles of at least 60°, preferably at least 70°, in particular at least 80°. These angles between the direction of transport of the appropriate discharge belt conveyor and the direction of transport of the feed belt conveyor can here be formed, on the one hand, in the direction of transport before and, on the other hand, in the direction of transport behind the appropriate discharge belt conveyor. For the sake of simplicity and for the purpose of installation space savings, it can here be particularly preferred if these angles measure at least substantially 90°.

In order to be able to operate the discharge belt conveyors on the one hand, and the feed belt conveyor on the other hand, independently of one another, it can be beneficial if different drive devices are assigned to the discharge belt conveyors and the feed belt conveyor. The discharge belt conveyors can here, where necessary, be jointly driven via a common drive device or via respectively separate drive units, where necessary independently of one another. At least, the at least one drive device of the discharge belt conveyors is preferredly provided, however, so as to be activable independently of the at least one drive device of the feed belt conveyor.

For the expedient controlling of the conveying device, it can be beneficial if there is provided a control device, which is configured to operate the feed belt conveyor and/or the discharge belt conveyors in synchronization. In this way, the discharge belt conveyors can be halted, for instance, while the feed belt conveyor adjusts the position of further piece goods. The piece goods can in this way be placed at a short distance apart, whereby the dwell time can be increased. Moreover, this gives an employee the option of operating many discharge belt conveyors side by side without piece goods falling onto the floor. In this respect, it is particularly preferred if the discharge belt conveyors are respectively operated in synchronization, in particular if the discharge belt conveyors are operated at the same rate. Regardless thereof, while the piece goods are advanced in the direction of the discharge belt conveyors, the propulsion of the feed belt conveyor can be stopped in order to improve the reliability of this method step and to make the distribution of the piece goods among the discharge belt conveyors more even.

If the control device is configured to stop the transport of the feed belt conveyor before the transport of the discharge belt conveyors is activated, an expedient decoupling which improves the reliability and predictability of the transport of the piece goods streams can be realized. This applies in particular when the control device is configured to activate the transport of the feed belt conveyor on the one hand, and the transport of the discharge belt conveyors on the other hand, respectively one after the other.

In a first, particularly preferred embodiment of the method, the feed belt conveyor, after the stoppage of the feed belt conveyor, at least in a transfer portion of the upper strand, is inclined, in particular tilted, in the direction of the discharge belt conveyors, out of a transport setting into a transfer setting. In this way, the upper strand, at least in the transfer portion, can firstly be expediently oriented in order to be reliably adjust the position of the piece goods, even over longer distances. Moreover, during the transfer of the piece goods in the direction of the discharge belt conveyors, the feed belt conveyors can be brought into an expediently inclined position. After completed transfer or relaying of the piece goods in the direction of the discharge belt conveyors, the feed belt conveyor, at least in the transfer portion of the upper strand, can be inclined, in particular tilted, out of the transfer setting back into the transport setting, so that an expedient orientation of the upper strand for the repositioning of further piece goods is again ensured.

Alternatively or additionally, the piece goods can be transported along regions of the belts of the discharge belt conveyors with low static friction, in the direction of transport of the feed belt conveyor. Moreover, the piece goods can be transported from regions of the belts of the discharge belt conveyors with high static friction, in the directions of transport of the discharge belt conveyors. The regions of low static friction and high static friction are then preferably provided alternately or alternatingly in the direction of transport of the belt. The regions of low static friction and/the regions of high static friction can here respectively have the same longitudinal extent. Moreover, all regions can have the same longitudinal extent, though this is not necessary. It can be beneficial if the length of the regions of high static friction and/or low static friction is somewhat greater than the length, height and/or width of the piece goods. The regions of different static friction are in particular expedient if the feed belt conveyor in the transfer portion and the adjoining regions of the discharge belt conveyor are mutually inclined roughly in a V-shape. An adjustment of the transfer region of the feed belt conveyor is then not absolutely necessary. The transfer portion of the feed belt conveyor is then inclined laterally downward in the direction of the discharge belt conveyors. The adjoining portions of the discharge belt conveyors are then, for their part, inclined laterally downward in the direction of the transfer portion of the feed belt conveyor.

The piece goods can be transported from the feed belt conveyor and, without great friction on the belts of the discharge belt conveyors, slide off. The discharge belt conveyors can then, with the regions of high static friction, take up the piece goods and transport them in the directions of transport of the discharge belt conveyors. The discharge belt conveyors and/or the feed belt conveyor can preferredly be operated in synchronization and one after another. It is also conceivable, however, for the discharge belt conveyors and/or the feed belt conveyor to be operated continuously. Where necessary, the feeding of respectively further piece goods can be realized such that it is tailored to the synchronization of the discharge belt conveyors in terms of the change of regions of different static friction contiguous to the transfer portion of the feed belt conveyor.

The static friction coefficient of the region of high static friction has together with a specific piece goods item, in particular having a cardboard contact surface, preferably a value which is at least twice, in particular at least three times, as high as the static friction coefficient of the region of low static friction together with the specific piece goods item, in particular having a cardboard contact surface. Alternatively or additionally, the static friction coefficient for the region of low static friction and the specific piece goods item, in particular having a cardboard contact surface, is less than 0.5, preferably less than 0.4, in particular less than 0.3. Alternatively or additionally, the static friction coefficient for the region of high static friction and the specific piece goods item, in particular having a cardboard contact surface, is greater than 0.5, preferably greater than 0.6, in particular greater than 0.7. The static friction coefficient is often also referred to as the friction factor and is regularly denoted as $\mu_H$ or $\mu_G$.

In order to avoid the design complexity and methodological complexity for adjusting the upper strand between the transport setting and the transfer setting, it can be expedient to keep the feed belt conveyor, during the transport of the piece goods and during the take-up and/or transfer of the piece goods, at least in a transfer portion of the upper strand, inclined, in particular tilted, in the direction of the discharge belt conveyors. It is then further beneficial, however, if the piece goods arranged at least on the transfer portion of the upper strand come into contact with at least one discharge belt conveyor. In this way, the piece goods in the transfer portion, during the transport by the feed belt conveyor, can initially be kept in contact with the feed belt conveyor by the discharge belt conveyors, and the piece goods can subsequently be more easily taken up by the discharge belt conveyors, where necessary without further support. In a corresponding procedure, it is further beneficial, for the gentle treatment of the piece goods, if the discharge belt conveyors and the feed belt conveyor are respectively operated chronologically one after the other. In this way, an unnecessary friction of the piece goods on the discharge belt conveyors and on the feed belt conveyor is avoided, and an even distribution of the piece goods among the discharge belt conveyors is ensured.

If at least one discharge belt conveyor, after the transport of at least one piece goods item with the at least one discharge belt conveyor, is extended and/or retracted in the telescoping direction of the discharge belt conveyor, the location up to which the piece goods are transported and can expediently be taken from the discharge belt conveyors by an employee can be varied. In particular in the loading and unloading of a load compartment with piece goods, it can be beneficial if the discharge belt conveyors are extended or retracted in steps in order to adapt the discharge belt conveyors to the changing state of load of the load compartment. In this way, the at least one discharge belt conveyor, after the transport of different piece goods with the at least one discharge belt conveyor, can preferredly be retracted or extended in the telescoping direction in steps.

Moreover, the method and the conveying device are in particular beneficial when, as the piece goods, packages are used. The packages are then constituted by repacked goods, in particular repacked piece goods. For this purpose, the aforesaid advantages are particularly of importance. The packages from the prior art can here comprise known packagings. Such packages having a cardboard and/or plastics packaging, in particular foil packaging, are, however particularly preferred. Further preferably, the piece goods or packages can here preferably be constituted by parcel consignments.

The advantages of the previously described method are also particularly apparent when the method for loading a load compartment, preferably a body of a commercial vehicle, in particular of a truck, trailer or semitrailer, is used. In this way, the piece goods can then very expediently be transported via the discharge belt conveyors side by side into the load compartment.

This can expediently be supported, for example in order to relieve the load on the employee loading the piece goods or in order to promote an automatic loading of the load compartment. For this, at least one discharge belt conveyor, in particular the discharge belt conveyors, with increasing loading of the load compartment, can be retracted in the telescoping direction, in particular in steps. In the case of an unloading, the at least one discharge belt conveyor can also be retracted in steps. For the automatic loading of the load compartment, the ends of the discharge belt conveyors, viewed in their direction of transport, can be adjustable in height, to be precise preferably when the discharge belt conveyors are configured as telescopic belt conveyors.

BRIEF DESCRIPTION OF THE DRAWINGS

The invention is explained in greater detail below with reference to a drawing representing merely an illustrative embodiment, in which.

DETAILED DESCRIPTION

Figure 1:
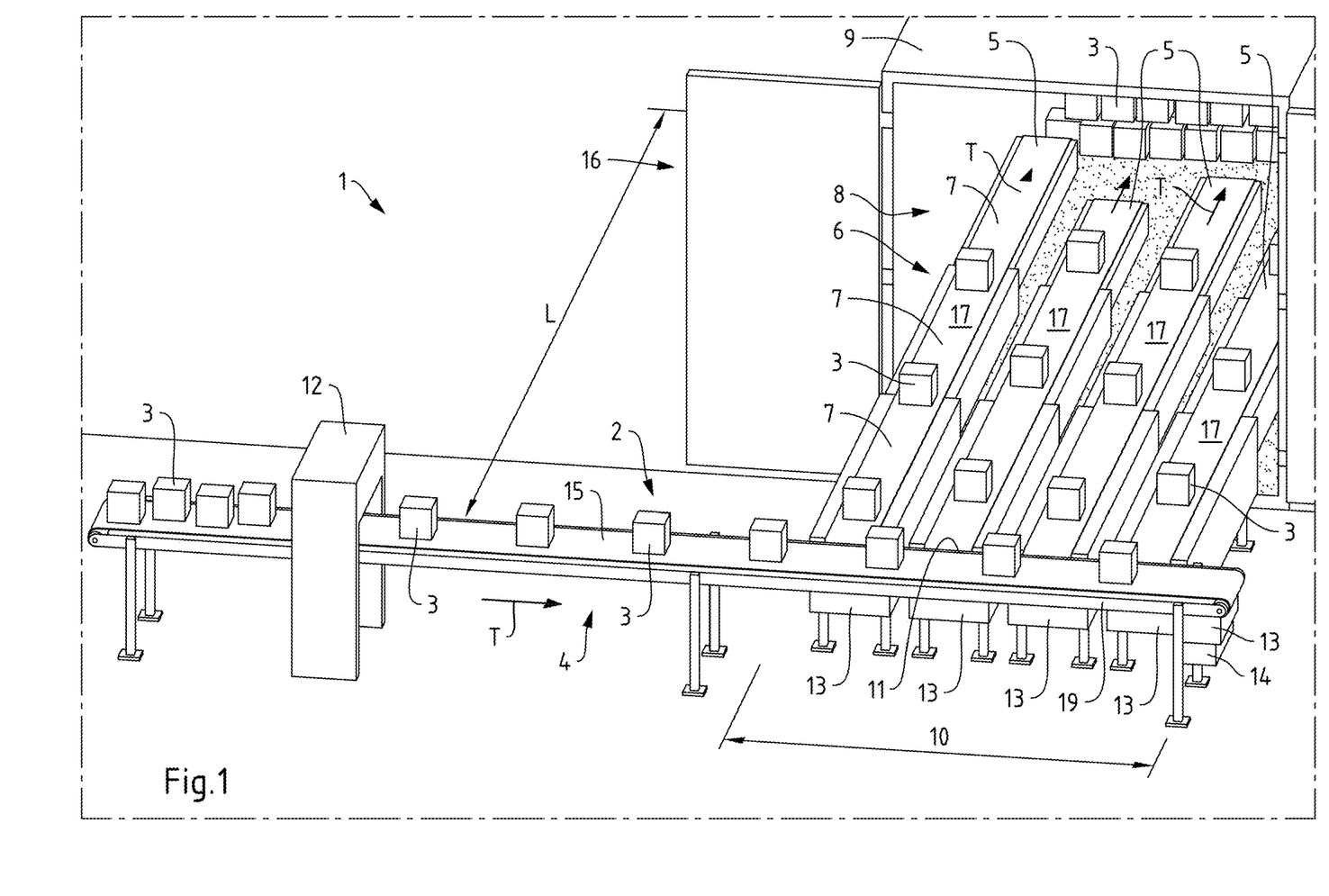
FIG. 1 shows a conveying device according to the invention in a schematic, perspective view.

In FIG. 1 is represented a conveying device 1, with which a piece goods stream 2, consisting of piece goods 3, is fed in a row, that is to say in series, via a feed belt conveyor 4, so as to convert said stream into a plurality of piece goods streams 5, which are discharged parallel to one another as a plurality of serial piece goods streams 5 of a plurality of discharge belt conveyors 6. The represented and, in this respect, preferred piece goods 3 are here constituted by packages in the form of parcel consignments. The discharge belt conveyors 6 are here constituted by telescopic belt conveyors, the transport length L of which in the direction of transport T of the discharge belt conveyors 6 can be varied by mutual extension or retraction of individual segments 7 of the discharge belt conveyors 6. The discharge belt conveyors 6 can thus be extended differently far into a load compartment 8 of a body 9 of a commercial vehicle, so that an employee can stack the piece goods 3 without great physical effort, and thus also very rapidly, in the load compartment 8, or so that the load compartment can be automatically loaded. With increasing loading of the load compartment 8, the discharge belt conveyors 6 are then retracted in steps.

The discharge belt conveyors 6 are assigned to a transfer portion 10 of a longitudinal side 11 of the feed belt conveyor 4. In the represented and, in this respect, preferred conveying device 1, the discharge belt conveyors 6 directly adjoin the feed belt conveyor 4. Between the feed belt conveyor 4 and the discharge belt conveyors 6 there could also be provided, however, at least one chute, at least one roller conveyor or another conveying means via which the piece goods 3 are relayed from the feed belt conveyor 4 to the discharge belt conveyors 6. Furthermore, in the represented and, in this respect, preferred conveying device 1, the discharge belt conveyors 6 are oriented in such a way relative to the feed belt conveyor 4 that the directions of transport T of the feed belt conveyor 4 and of the discharge belt conveyors 6 are arranged at least substantially at right angles to one another. What is more, the discharge belt conveyors 6 stand directly side by side, so that at most a small gap remains between the individual discharge belt conveyors 6.

In order to be able to distribute the piece goods 3 from the feed belt conveyor 4 evenly and easily among the discharge belt conveyors 6, in the represented and, in this respect, preferred conveying device 1 there is provided, assigned to or connected upstream of the feed belt conveyor 4 a separating device 12, which separates the piece goods 3 from one another in such a way that the spacing of the respectively successive piece goods 3 corresponds at least roughly to the spacing of the discharge belt conveyors 6. By this is meant, however, not the distance between the mutually assigned sides of the discharge belt conveyors 6, that is to say the gap between the discharge belt conveyors 6, but rather the distance between same points on the discharge belt conveyors 6. For instance, what is meant is the distance that the center lines of the mutually adjacent discharge belt conveyors 6 have one from another. Once the, in the direction of transport T of the feed belt conveyor 4, front piece goods item 3 of the piece goods stream 2 fed via the feed belt conveyor 4 has reached the region of the, in this direction, front discharge belt conveyor 6, the feed belt conveyor 4 can be stopped. Upon this, there is likewise found on the feed belt conveyor 4, contiguous to each of the further discharge belt conveyors 6, a piece goods item 3.

The appropriate row of piece goods 3 in the transfer portion 10 can now be jointly relayed to the discharge belt conveyors 6, which at this moment are initially still stopped. With the take-up of the piece goods 3, the discharge belt conveyors 6, however, are driven, to be precise, in the represented and, in this respect, preferred conveying device 1, jointly and simultaneously. Once the piece goods 3 previously received from the discharge belt conveyors 6 have been moved on and the discharge belt conveyors 6, at their rear ends, once again have space to receive further piece goods 3, the discharge belt conveyors 6 are stopped again. After the front piece goods 3 of the feed belt conveyor 4 have been relayed to the discharge belt conveyors 6, the feed belt conveyor 4 is driven once again in order to supply further piece goods 3. The feed belt conveyor 4 is then stopped again once the, viewed in the direction of the direction of transport T of the feed belt conveyor 4, front piece goods item 3 of the row of piece goods 3 on the feed belt conveyor 4 reaches the region of the, in this direction, front discharge belt conveyor 6. The front piece goods 3 in the transfer portion 10 are now once again relayed to the laterally adjoining discharge belt conveyors 6, as has already previously been described.

The discharge belt conveyors 6 and the feed belt conveyor 4 are then further respectively driven in steps, so that the serial piece goods stream 2 of the feed belt conveyor 4 is converted into a plurality of serial and mutually parallelly oriented piece goods streams 5. In order to be able to provide the appropriate step-by-step or synchronized operation of the discharge belt conveyors 6 and of the feed belt conveyor 4, in the represented and, in this respect, preferred conveying device 1 dedicated drive devices 13 are respectively assigned to the discharge belt conveyors 6 and the feed belt conveyor 4. The drive devices 13 are connected, moreover, to a common control device 14.

Figure 2A:
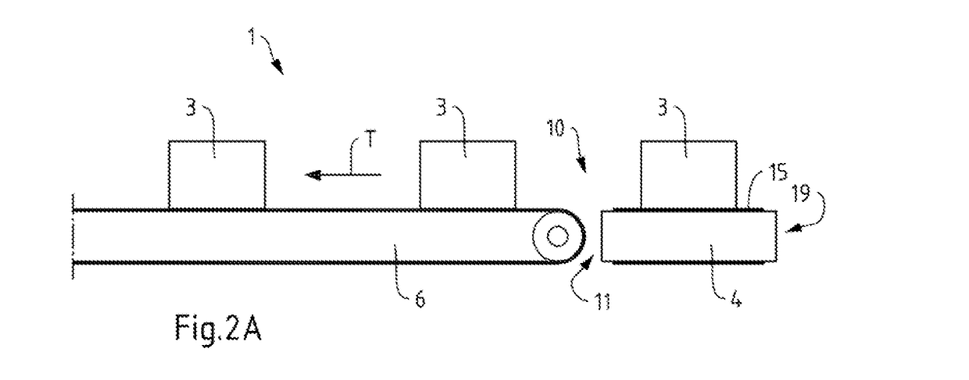
FIGS. 2A-C show a detail of the conveying device from FIG. 1 in a transport setting and in a transfer setting, during different method steps, in a schematic sectional view.
Figure 2B:
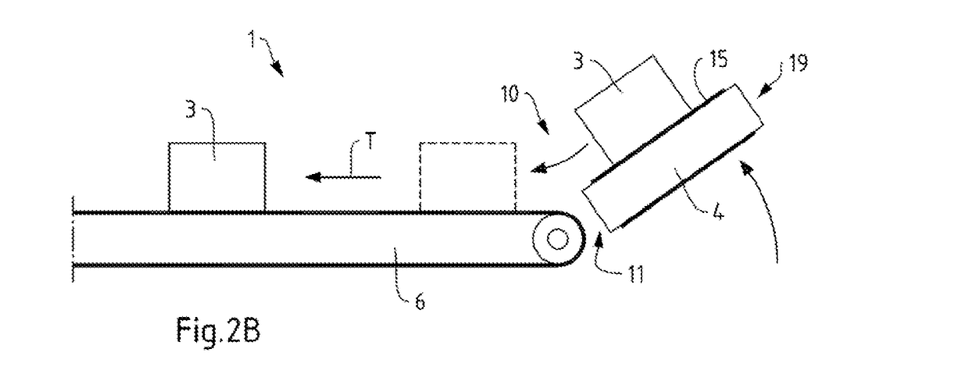

In FIG. 2A-C, the conveying device 1 is represented in a sectional view in the region of the transfer portion 10 of the feed belt conveyor 4. In the situation represented in FIG. 2A, on the feed belt conveyor 4, in the transfer portion 10 of the feed belt conveyor 4 and in the take-up region of a discharge belt conveyor 6, is found a row of piece goods 3 one behind another. Both the feed belt conveyor 4 and the discharge belt conveyor 6 stand idle at this moment. The transfer portion 10 of the feed belt conveyor 4 is now tilted out of the transport setting represented in FIG. 2A, to be precise in the direction of the adjoining discharge belt conveyor 6, as is represented in FIG. 2B.

The upper strand 15 of the feed belt conveyor 4 is by now, at least in the transfer portion 10, in a transfer setting. In the transfer setting, that longitudinal side 11 of the feed belt conveyor 4 that is assigned to the discharge belt conveyor 6, at least in the transfer portion 10, is arranged lower than the opposite longitudinal side 19 of the feed belt conveyor 4. In this setting, the upper strand 15, in a cross-sectional view, is found, at least substantially uniformly over the width of the upper strand 15 in this portion, at an angle to the horizontal of approximately 45°. The piece goods item 3 thus slides from the feed belt conveyor 4 onto the rear end of the discharge belt conveyor 6. The same happens parallel with further piece goods 3 which at other points on the transfer portion 10 slide down from the feed belt conveyor 4 onto other discharge belt conveyors 6.

Figure 2C:
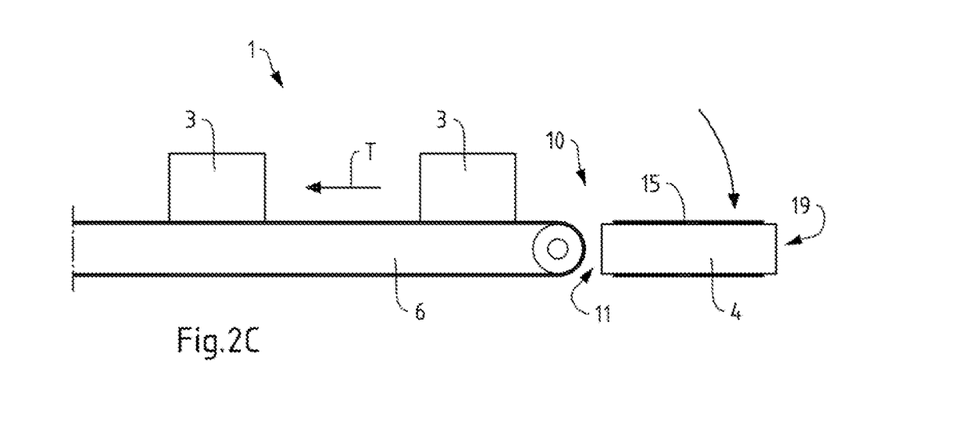

Subsequently, the feed belt conveyor 4 is tilted back again into the transport setting represented in FIG. 2C and is once again driven for the advancement of further piece goods 3. In time or independently of one another, the discharge belt conveyor 6 too is briefly driven, in order to, at its rear end, once again create space for receiving a further piece goods item 3. The method steps according to FIG. 2A-C are then repeated in steps.

Figure 3:
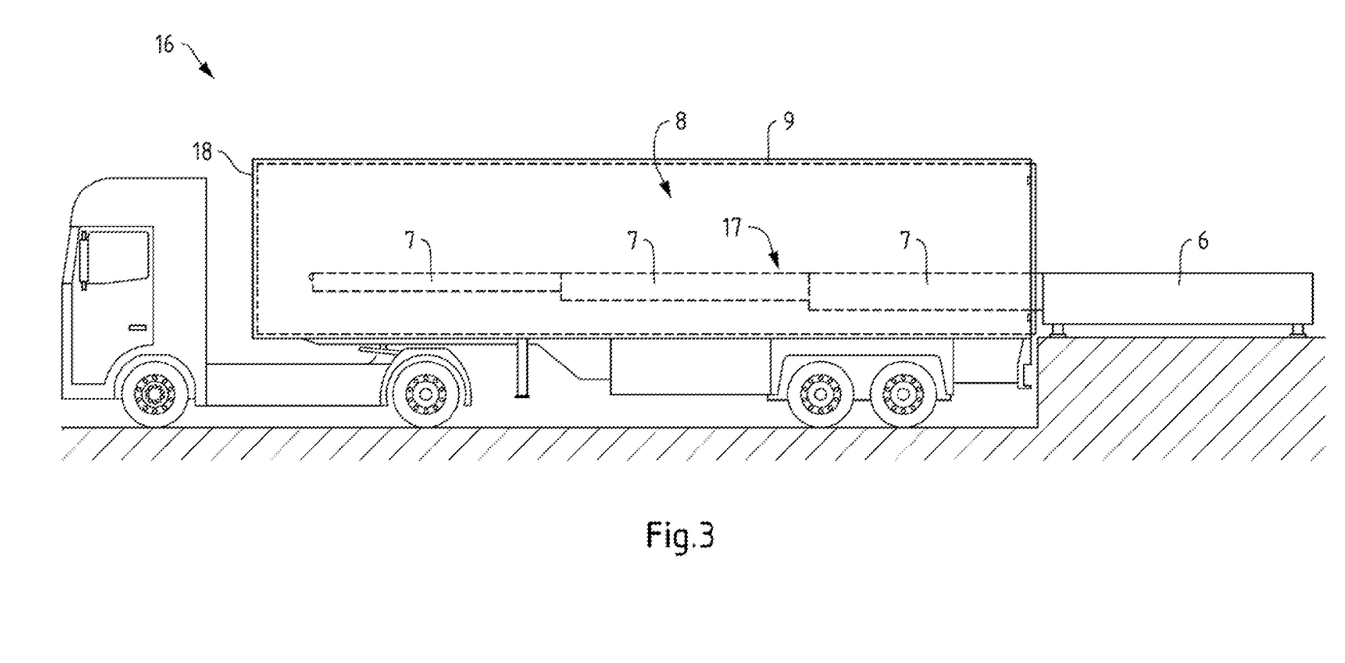
FIG. 3 shows a discharge conveyor of the conveying device from FIG. 1, in part in a load compartment of a body of a commercial vehicle, in a schematic side view.

In FIG. 3, a discharge belt conveyor 6 of the conveying device 1 from FIG. 1 is represented in the form of the telescopic belt conveyor, which in part juts into a load compartment 8 of the body 9 of the commercial vehicle 16. The discharge belt conveyor 6 has a plurality of mutually extensible segments 7, wherein the belt 17 of the discharge belt conveyor 6 respectively extends from the rear end of the discharge belt conveyor 6 up to its front end, to be precise regardless of how far the front end of the discharge belt conveyor 6 is respectively extended. At the start of the loading of the load compartment 8, the discharge belt conveyors 6 are navigated up to close to the end wall 18 of the load compartment 8, into the latter. With increasing loading of the load compartment 8, the discharge belt conveyors 6 are then extended in steps.

Figure 4A:
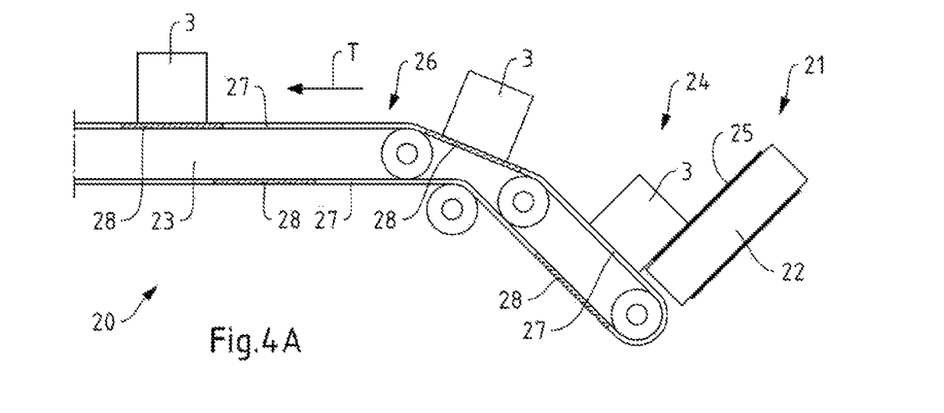
FIGS. 4A-C show a detail of an alternative conveying device in the region of the transfer portion during different method steps, in a schematic sectional view.
Figure 4B:
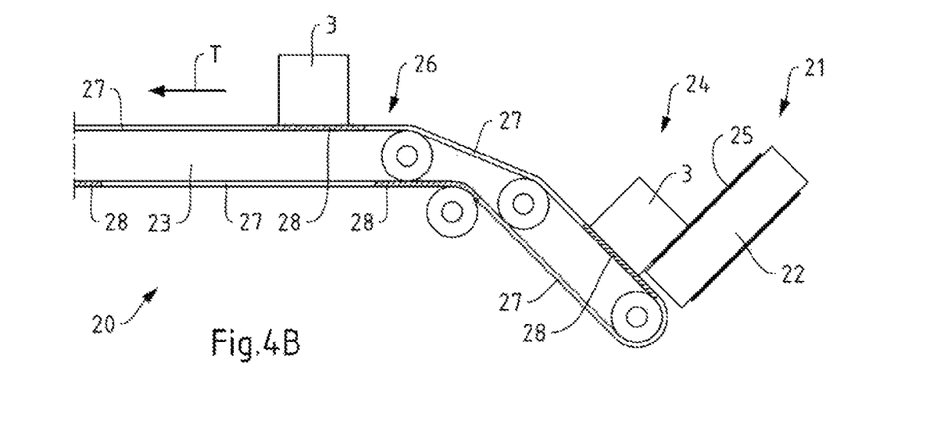
Figure 4C:
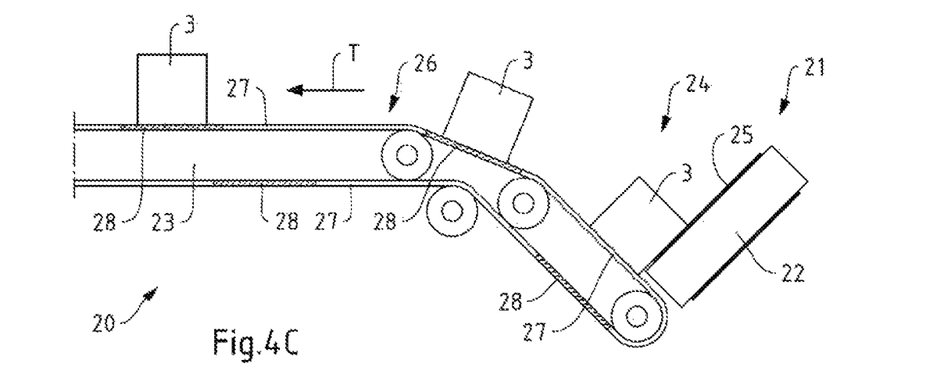

In FIG. 4A-C, an alternative conveying device 20 is represented in a sectional view in the region of the transfer portion 21 of the feed belt conveyor 22. The transfer portion 21 forms with the adjoining portions of the discharge belt conveyors 23 an at least substantially V-shaped region 24 of the conveying device 20. This has the effect that the piece goods 3, while they are fed according to FIG. 4A by the feed belt conveyor 22, come not only into contact with the belt 25 of the feed belt conveyor 22, but also with the belt 26 of the at least one discharge belt conveyor 23. Adjoining the transfer portion of the feed belt conveyor 22 is here provided a region of low static friction 27 of the belt 26 of the at least one discharge belt conveyor 23, so that the piece goods item 3, without great friction on the belt 26 of the at least one discharge belt conveyor 23, can slide off, in order to transport the piece goods item 3 to a discharge belt conveyor 23 further forward in the direction of transport T of the feed belt conveyor 22. If, for instance, contiguous to the discharge belt conveyors 23, piece goods 3 are provided, due to the operation of the discharge belt conveyors 23, the regions with higher static friction 28 take up the piece goods 3 and then transport the piece goods 3 in the direction of transport T of the discharge belt conveyors 23. In this way, further, following regions of low static friction 27 of the belts 26 of the discharge belt conveyors 6 make their way into a position adjoining the transfer portion 21 of the feed belt conveyor 22, so that, according to FIG. 4C, piece goods 3 transported via the feed belt conveyor 22 can now again be transported past the discharge belt conveyors 23. The feed belt conveyor 22 and/or the discharge belt conveyors 23 can here be driven in synchronization or continuously, though a synchronized drive should be simpler from a control engineering viewpoint.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE SYMBOL LIST 1 conveying device
2 piece goods stream
3 piece goods item
4 feed belt conveyor
5 piece goods stream
6 discharge belt conveyor
7 segment
8 load compartment
9 body
10 transfer portion
11 longitudinal side
12 separating device
13 drive device
14 control device
15 upper strand
15 commercial vehicle
17 belt
18 end wall
19 longitudinal side
20 conveying device
21 transfer portion
22 feed belt conveyor
23 discharge belt conveyor
24 V-shaped region
25 belt
26 belt
27 region of low static friction
28 region of high static friction
L transport length
T direction of transport

The invention claimed is:

1. A conveying device for converting a serially transported piece goods stream into a parallelly transported piece goods stream, comprising:
 a feed belt conveyor for the serial feeding of the piece goods stream; and
 a plurality of discharge belt conveyors for the parallel discharging of the fed piece goods stream;
 wherein the discharge belt conveyors are assigned directly or indirectly to a longitudinal side of the feed belt conveyor;
 wherein the directions of transport of the discharge belt conveyors are oriented at least substantially parallel to one another and transversely to the direction of transport of the feed belt conveyor;
 wherein the discharge belt conveyors are configured as telescopic belt conveyors; and wherein the longitudinal side of the upper strand of the feed belt conveyor that is assigned to the discharge belt conveyors, in particular in a transfer setting, and at least in a transfer portion of the upper strand for relaying the piece goods to the discharge belt conveyors, is arranged lower than the opposite longitudinal side of the upper strand of the feed belt conveyor, further comprising a control device, wherein the control device is configured for the synchronized operation of the feed belt conveyor and/or of the discharge belt conveyors, wherein the control device is configured to stop the transport of the feed belt conveyor before the transport of the discharge belt conveyors is activated, and wherein, preferably, the control device is configured to activate the transport of the feed belt conveyor on the one hand, and the transport of the discharge belt conveyors on the other hand, respectively one after the other.

2. The conveying device according to claim 1, wherein the feed belt conveyor is adjustable from a transport setting, comprising an at least substantially planar orientation at least of the transfer portion of the upper strand, into the transfer setting, comprising a downward inclination of that longitudinal side of the upper strand, at least of the transfer portion, that is assigned to the discharge belt conveyors, and back again.

3. The conveying device according to claim 1, wherein different drive devices are assigned to the discharge belt conveyors and the feed belt conveyor, and wherein the at least one drive device of the discharge belt conveyors are activable independently of the at least one drive device of the feed belt conveyor.

4. The conveying device according to claim 1, wherein at least in the transfer setting, at least the transfer portion of the upper strand of the feed belt conveyor is inclined downward at an averaged angle, related to at least substantially the total width of the upper strand, of at least 25°, preferably of at least 35°, in particular of at least 45°, to that longitudinal side of the feed belt conveyor that is assigned to the discharge belt conveyors.

5. The conveying device according to claim 1, wherein the directions of transport of the discharge belt conveyors form with the direction of transport of the feed belt conveyor angles of at least 60°, preferably at least 70°, in particular at least 80°.

6. A conveying device for converting a serially transported piece goods stream into a parallelly transported piece goods stream, comprising:
a feed belt conveyor for the serial feeding of the piece goods stream; and
a plurality of discharge belt conveyors for the parallel discharging of the fed piece goods stream;
wherein the discharge belt conveyors are assigned directly or indirectly to a longitudinal side of the feed belt conveyor;
wherein the directions of transport of the discharge belt conveyors are oriented at least substantially parallel to one another and transversely to the direction of transport of the feed belt conveyor;
wherein the discharge belt conveyors are configured as telescopic belt conveyors; and
wherein the longitudinal side of the upper strand of the feed belt conveyor that is assigned to the discharge belt conveyors, in particular in a transfer setting, and at least in a transfer portion of the upper strand for relaying the piece goods to the discharge belt conveyors, is arranged lower than the opposite longitudinal side of the upper strand of the feed belt conveyor;

wherein the discharge belt conveyors have belts comprise, preferably alternatingly arranged, regions of different static friction, and wherein, preferably, the transfer portion and the adjoining portions of the discharge belt conveyors jointly form an at least substantially V-shaped region of the conveying device.

7. A method for converting a serially transported piece goods stream into a parallelly transported piece goods stream, using a feed belt conveyor for the serial feeding of the piece goods stream, and using a plurality of discharge belt conveyors, configured as telescopic belt conveyors, for the parallel discharging of the fed piece goods stream, wherein the discharge belt conveyors are assigned directly or indirectly to a longitudinal side of the feed belt conveyor, wherein the directions of transport of the discharge belt conveyors are oriented at least substantially parallel to one another and transversely to the direction of transport of the feed belt conveyor, comprising
feeding, by means of the feed belt conveyor, a piece goods stream in series,
stopping the feed belt conveyor when or before the, in the direction of transport of the feed belt conveyor, front piece goods reach the, in the direction of transport of the feed belt conveyor, front end of the feed belt conveyor,
transferring the piece goods from the feed belt conveyor to the discharge belt conveyors or taking the piece goods up from the feed belt conveyor by the discharge belt conveyors,
transporting the piece goods, in particular at least substantially simultaneously, by the discharge belt conveyors, transversely to the direction of transport of the feed belt conveyor, away from the feed belt conveyor,
feeding further piece goods from the feed belt conveyor to the discharge belt conveyors.

8. A method for loading a load compartment, preferably a body of a commercial vehicle, in particular of a truck, trailer or semitrailer, using the method according to claim 7, comprising
transporting the piece goods via the discharge belt conveyors side by side into the load compartment.

9. The method according to claim 8,
wherein at least one discharge conveyor, in particular the discharge belt conveyors, with increasing loading of the load compartment, is/are retracted in the telescoping direction, in particular in steps.

10. The method according to claim 7,
wherein the feed belt conveyor, after the stoppage of the feed belt conveyor, at least in a transfer portion of the upper strand, is inclined, in particular tilted, in the direction of the discharge belt conveyors, out of a transport setting into a transfer setting, and
wherein, after the transfer of the piece goods to the discharge belt conveyors, the feed belt conveyor, at least in the transfer portion of the upper strand, is inclined, in particular tilted, out of the transfer setting back into the transport setting.

11. The method according to claim 7,
wherein the piece goods are transported along regions of the belts of the discharge belt conveyors with low static friction, in the direction of transport of the feed belt conveyor, and
wherein the piece goods are transported from regions of the belts of the discharge belt conveyors with high static friction, in the directions of transport of the discharge belt conveyors, and wherein, in the belts, the regions of low static friction and the regions of high static friction alternate.

12. The method according to claim 7, wherein the feed belt conveyor, during the transport of the piece goods and during the take-up and/or transfer of the piece goods, at least in a transfer portion of the upper strand, is inclined, in particular tilted, in the direction of the discharge belt conveyors, and wherein the piece goods arranged at least on the transfer portion of the upper strand come into contact with at least one discharge belt conveyor.

13. The method according to claim 7, wherein at least one discharge belt conveyor, after the transport of at least one piece goods item with the at least one discharge belt conveyor, is extended or retracted in the telescoping direction, and wherein the at least one discharge belt conveyor, after the transport of different piece goods with the at least one discharge belt conveyor, is retracted or extended in the telescoping direction in steps.

14. The method according to claim 7, wherein packages are transported as piece goods with the feed belt conveyor and the discharge belt conveyors.

* * * * *